United States Patent [19]
Dinnis et al.

[11] Patent Number: 5,497,813
[45] Date of Patent: Mar. 12, 1996

[54] APPARATUS FOR OPENING SEALED CONTAINERS

[76] Inventors: Reinfrid C. Dinnis, Clubworthy Farm, North Petherwin, Launceston, Cornwall; Samuel T. A. Dinnis, North Moor, Whitstone, Holsworthy, Devon, EX22 6TD, both of Great Britain

[21] Appl. No.: 74,803

[22] PCT Filed: Nov. 22, 1991

[86] PCT No.: PCT/GB91/02072

§ 371 Date: Jun. 10, 1993

§ 102(e) Date: Jun. 10, 1993

[87] PCT Pub. No.: WO92/09521

PCT Pub. Date: Jun. 11, 1992

[30] Foreign Application Priority Data

Nov. 23, 1990 [GB] United Kingdom ............... 9025529
Mar. 7, 1991 [GB] United Kingdom ............... 9104859

[51] Int. Cl.⁶ .................. B65B 1/04; B65B 3/04
[52] U.S. Cl. .............. 141/329; 141/65; 141/89; 141/91; 134/115 R
[58] Field of Search ............... 141/329, 330, 141/65, 719, 320, 321, 322, 89, 90, 91, 375, 97, 352–354, 92; 134/62, 166 R, 169 R, 115 R

[56] References Cited

U.S. PATENT DOCUMENTS

| 1,821,230 | 9/1931 | Murphy | 141/352 |
|---|---|---|---|
| 2,491,516 | 12/1949 | Piggot et al. | 134/62 X |
| 2,603,858 | 7/1952 | Bruce et al. | 134/62 X |
| 4,058,412 | 11/1977 | Knapp et al. | 134/62 X |
| 4,146,156 | 3/1979 | Cassia | 141/330 |
| 4,289,255 | 9/1981 | Strampe | 141/330 X |
| 4,628,972 | 12/1986 | LaRochelle | 141/91 |
| 4,846,236 | 7/1989 | Deruntz | |
| 4,967,776 | 11/1990 | Folmar | 134/62 X |
| 5,074,342 | 12/1991 | Kraehn | 141/65 |
| 5,111,910 | 5/1992 | Sheppard, Jr. | 141/330 X |
| 5,132,088 | 7/1992 | Watahake | 141/90 X |
| 5,279,796 | 1/1994 | Parker et al. | 141/91 X |

FOREIGN PATENT DOCUMENTS

| 0249377 | 12/1987 | European Pat. Off. |
| 2824601 | 12/1979 | Germany. |

OTHER PUBLICATIONS

J. Crucq; 'De Nieuwe Douven Veldspuiten' LM Landbouwmechanisatie, vol. 40, No. 12, Dec. 1989, Wageningen, NL pp. 16–19.

A. Peeters: 'Reinigen Verpakkingen' LM Landbouwmechanisatie, Vo. 40, no. 11, Nov. 1989, Wageningen NL pp. 72–75.

Primary Examiner—J. Casimer Jacyna
Assistant Examiner—Steven O. Douglas
Attorney, Agent, or Firm—Larson and Taylor

[57] ABSTRACT

Apparatus for opening sealed containers, especially containing concentrated agricultural chemical solutions intended for dilution and spraying, consists of a seal rupturing element (14) and seal cutting elements (13) which, having pierced the seal, cut it to form sector-like flaps which are pressed back against the internal wall of the neck of the container. Preferably, the apparatus also includes means (28, 18 and 15) to flush out the interior of the container. The apparatus may form part of industrial spraying equipment and may be mounted in the charging hopper, whereby a sealed container is presented inverted to the apparatus so that the contents flow by gravity to the hopper once the seal is broken.

16 Claims, 8 Drawing Sheets

APPARATUS FOR OPENING SEALED CONTAINERS

FIELD OF THE INVENTION

This invention relates to means for the opening of sealed containers, particularly of containers which contain hazardous liquid material.

BACKGROUND OF THE INVENTION

The use of plastics or other containers having a metallic foil or other membrane closure sealed to the neck thereof is commonplace; such containers are used for materials as diverse as milk and industrial chemicals. However, the removal or other treatment of the seal to gain access to the contents is difficult and presents particular problems when the contents are liquid and hazardous, in that splashes are likely to occur or the operative's fingers are likely to come in contact with the contents. Such containers are commonly used for the packaging of concentrated agricultural chemical solutions intended for spraying. To prepare the solution for spraying, the operative will need to open one or more containers and discharge part or all of the contents to a feed tank in which the chemical is diluted to the required spraying concentration. The operative will generally wish to keep the initial addition and mixing time and subsequent replenishment times to a minimum for economic reasons, but this militates against the use of recommended safety procedures and increases the risks of spillage, splashing or the increase of other potentially hazardous exposures. These risks are present despite the use of protective clothing and may be exacerbated in windy conditions.

SUMMARY OF THE INVENTION

One object of the present invention is to provide apparatus the use of which will facilitate the fast and safe opening of containers of the type described and the discharge of the contents thereof.

Another object of the invention is to provide for the container, which having been opened and the contents discharged, needs to be washed out, thereby rendering the container safe for disposal.

According to one aspect of the invention, apparatus for the opening of sealed containers (as hereinbefore defined) comprises a seal rupturing element and a plurality of seal cutting elements, the rupturing element and cutting elements being carried by a common support member, whereby in use the seal is firstly ruptured and then cut to form sector-like flaps.

The seal rupturing element may be formed integrally with the seal cutting elements and preferably comprises a point but may be formed as a cone or as a part of a sphere or as a small-diameter circular cutting edge at one end of a cylindrical part which constitutes the support member. The seal cutting elements preferably comprise linear cutting edges which are inclined away from the seal rupturing element at an angle, preferably an acute angle with respect to the longitudinal axis of the support member, whereby rotation of the apparatus about the said axis would cause a notional cone or frustum to be generated by the seal cutting elements.

It will be appreciated that, in use, the apparatus will cut the seal to form sector-like flaps the edges of which extend to the inner edge of the neck of the container, provided that the diameter of the neck is not greater than the base diameter of the notional cone or frustum, that is, twice the maximum distance between any one of the cutting elements and the axis of the cylindrical part. It will also be appreciated that, having formed such sector-like flaps, relative turning movement between the apparatus and the container about the axis of the cylindrical part will cause the cutting elements to engage the cut edges of the flaps adjacent the neck of the container and progressively to move along the bases of the flaps, tending to urge them inwardly of the neck and towards the inner surface thereof, thereby creating an effectively unencumbered opening to the container for fast egress of the contents thereof.

A preferred number of cutting elements is four, arranged substantially equi-angularly around the support member.

The apparatus according to the invention may include means for flushing out the interior of the container. In a preferred arrangement, the support member comprises a pipe connected to a supply of water or other flushing liquid, whereby the contents of the container may be flushed out to render the empty container safe for disposal. The pipe may include valve means to control the supply of water, operated automatically by pressure exerted by the neck of a container on or after opening the seal thereof. One way of achieving this is to provide valve actuating elements which are mounted as part of the support member, the elements being displaceable from an "off" to an "on" position by contact with or pressure exerted by the neck of the container. The valve actuating elements, which are preferably biassed towards the "off" or closed position, may be movable relative to the seal cutting elements or, in an alternative arrangement, may be constituted by the seal cutting elements.

The head end of the pipe, through which flushing water issues, may constitute the seal rupturing element and may be formed as a cone or as a part of a sphere which may include an array of apertures through which flushing water issues as a spray having a pattern to contact substantially all parts of the inner wall of the container, for effective cleaning thereof. Alternatively, the head end of the pipe may be open and the edge may be sharpened and/or formed at an oblique angle to provide the seal rupturing element.

The inventive apparatus is particularly intended to be used as part of agricultural or other industrial spraying equipment. In the use of such equipment, the chemical concentrate is generally charged to the feed tank via a filter incorporated in the base of a charging hopper. According to the invention, the inventive apparatus may be constructed as an integral part of the charging hopper, supported from the base or sides thereof and with the head member extending generally upwardly. In use, the spraying operative merely inverts the sealed container over the head member and thrusts the container downwardly while giving it a twisting movement, thereby rupturing the seal by piercing it and forming sector-like flaps and, substantially simultaneously or immediately thereafter, causing the flaps to be bent back towards the interior of the neck, the contents then flowing direct into the charging hopper. If the apparatus also includes a water supply means, the interior of the container is then flushed out to the charging hopper.

The inventive apparatus may also include a shroud means to surround the neck of a container during the opening and emptying thereof, to contain any lateral splashing or wind-spraying of the chemical concentrate and to prevent contact thereof with the operative. Such shroud means may be telescopic and biassed towards the open or extended condition, whereby substantially the entire vertical height between the aperture of the container and the base of the charging hopper is protected from splashing and wind-spraying.

BRIEF DESCRIPTION OF THE DRAWINGS

Embodiments of the invention will now be described by way of example with reference to the accompanying drawings, of which

DESCRIPTION OF THE PREFERRED EMBODIMENTS

Figure 1:
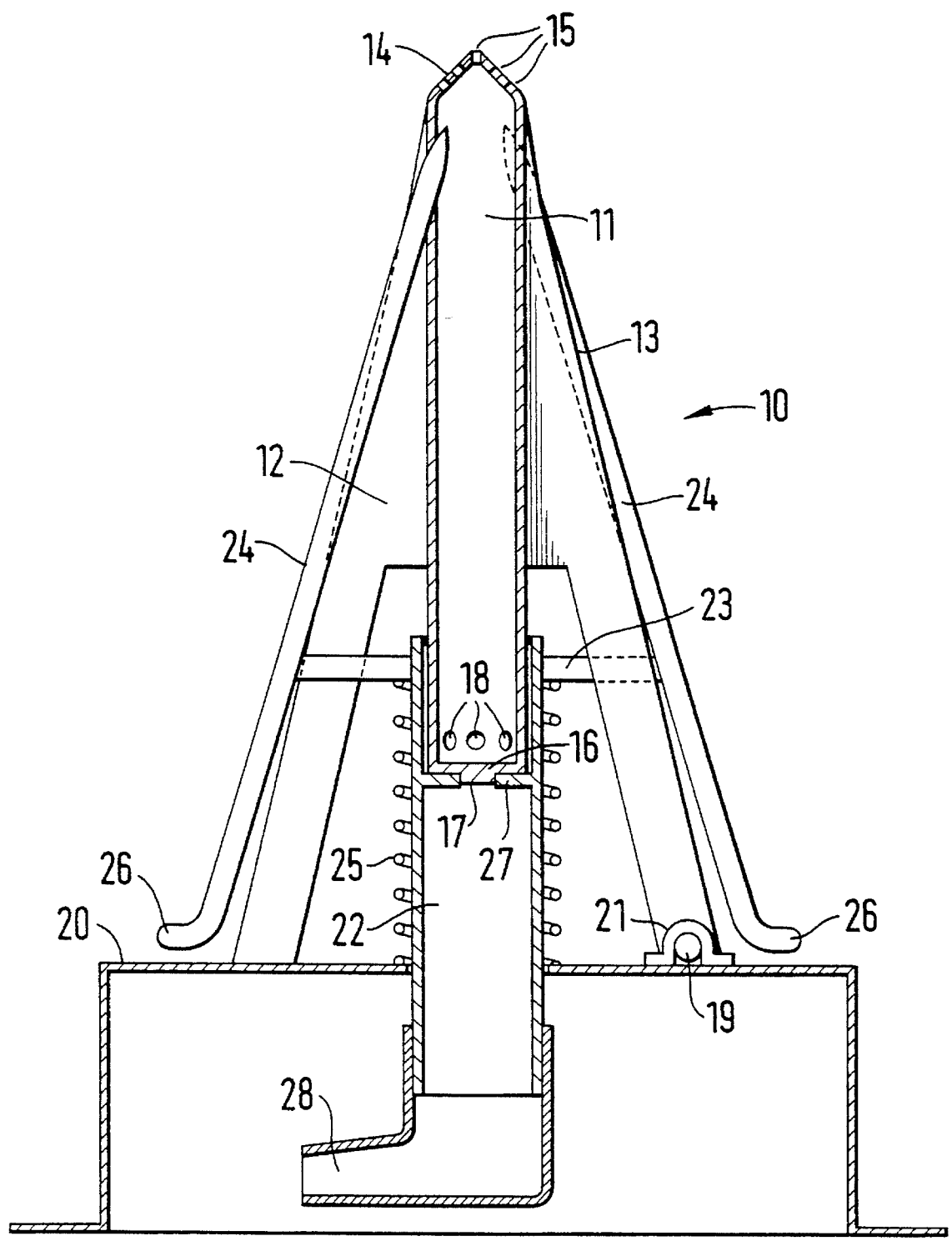
FIG. 1 is a side elevational view, partly in cross section, of one form of a seal piercing and container flushing apparatus.

Referring firstly to FIGS. 1 to 4, the apparatus is shown generally at 10 and consists of a first tube 11 supported by four legs or vanes 12 with angled outer edges 13. The upper end of the tube is formed as a cone 14 with an array of holes 15 formed therein. The lower end of the tube is closed by a blanking element 16 which has a short central cylindrical part 17 extending from the lower face thereof. An array of holes 18 is formed in the lower end region of the tube wall.

Figure 2:
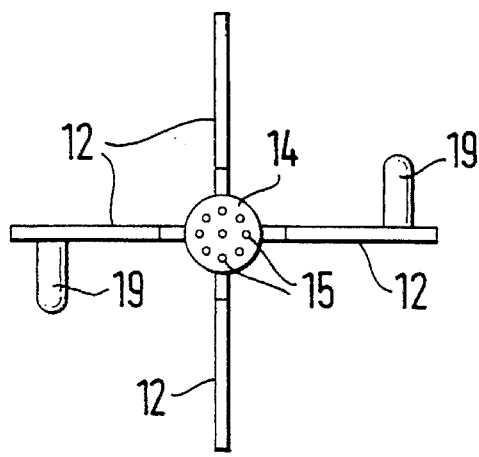
FIG. 2 is a plan view of the seal piercing and cutting element of the apparatus of FIG. 1.
Figure 4:
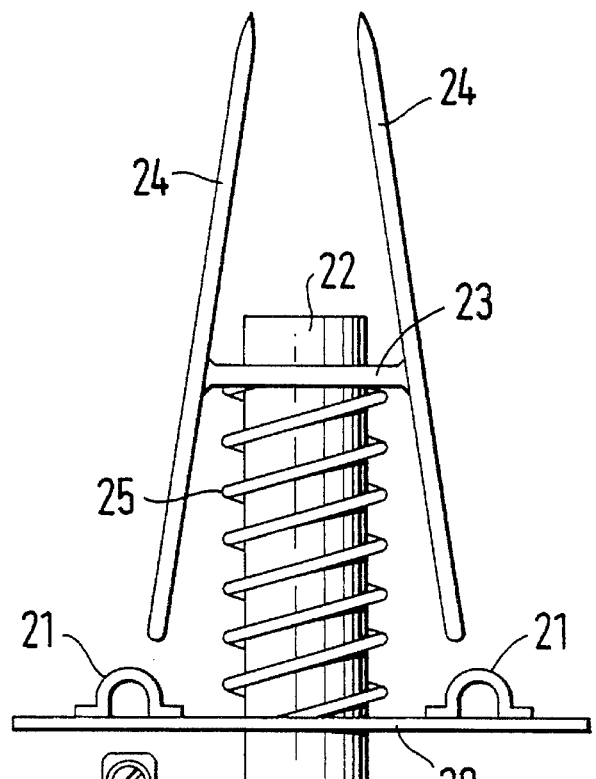
FIG. 4 is a side elevation of the flushing mechanism of the apparatus of FIG. 1.
Figure 3:
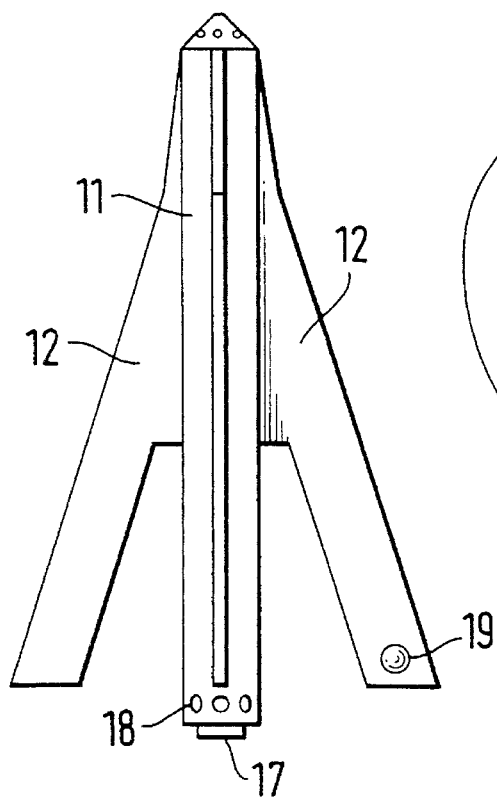
FIG. 3 is a plan view of the element of FIG. 2.

As shown in FIG. 2, the legs are disposed equi-angularly about the tube and extend radially therefrom. Lugs 19 are provided at the lower ends of two of the legs 12, extending in opposite directions, for the purpose of attachment of the tube to a base plate 20 via brackets 21, in a manner yet to be described.

A second tube 22 is carried for sliding reciprocating movement in an aperture formed in the base plate 20. The upper end region of the tube 22 carries a collar 23 which supports a pair of arms 24 which are angled inwardly and upwardly. The tube 22 is biassed upwardly by a suitable biassing means, which in the embodiment illustrated is represented by a compression spring 25.

The tube may be displaced downwardly against the biassing pressure until the lower ends of the arms 24, formed as outwardly curved portions 26, contact the base plate 20. The tube 22 has an internal diameter slightly larger than the external diameter of the tube 11 and is formed towards its upper end with an internal flange 27, the diameter of the hole in which is the same as or greater than the diameter of the cylindrical extension 17 formed at the bottom of tube 11. A washer or other resilient sealing element may be provided between the flange 27 and the lower end of the tube 11. The lower end of the tube 22 is connected to a source of water, via connection member 28.

In assembly of the apparatus for use, the lower end of the tube 11 is inserted in the upper end of tube 22 until the blanking element 16 makes contact with the internal flange 27, which thus forms a seat for the tube 11. An "O"-ring seal is provided between the tubes, towards the upper end of tube 22. With slight downward pressure against spring 25, the lower ends of the legs 12 contact the base plate 20 and a twisting movement engages lugs 19 in brackets 21, thus retaining the tube 11 in sealing engagement with the outer tube 22.

The dimensions and angle of the arms 24 are selected so that, in the assembled condition, the arms extend slightly externally of the legs 12 or of a notional frustum generated by the legs 12 on rotation of the tube 11 about its longitudinal axis. It will be understood that the arms 24 each lie in a 90° sector defined by two adjacent legs 12, the sectors being diametrically opposed, when viewed from above.

The apparatus as described is contained within a charging hopper or other reservoir of spraying apparatus.

Figure 5:
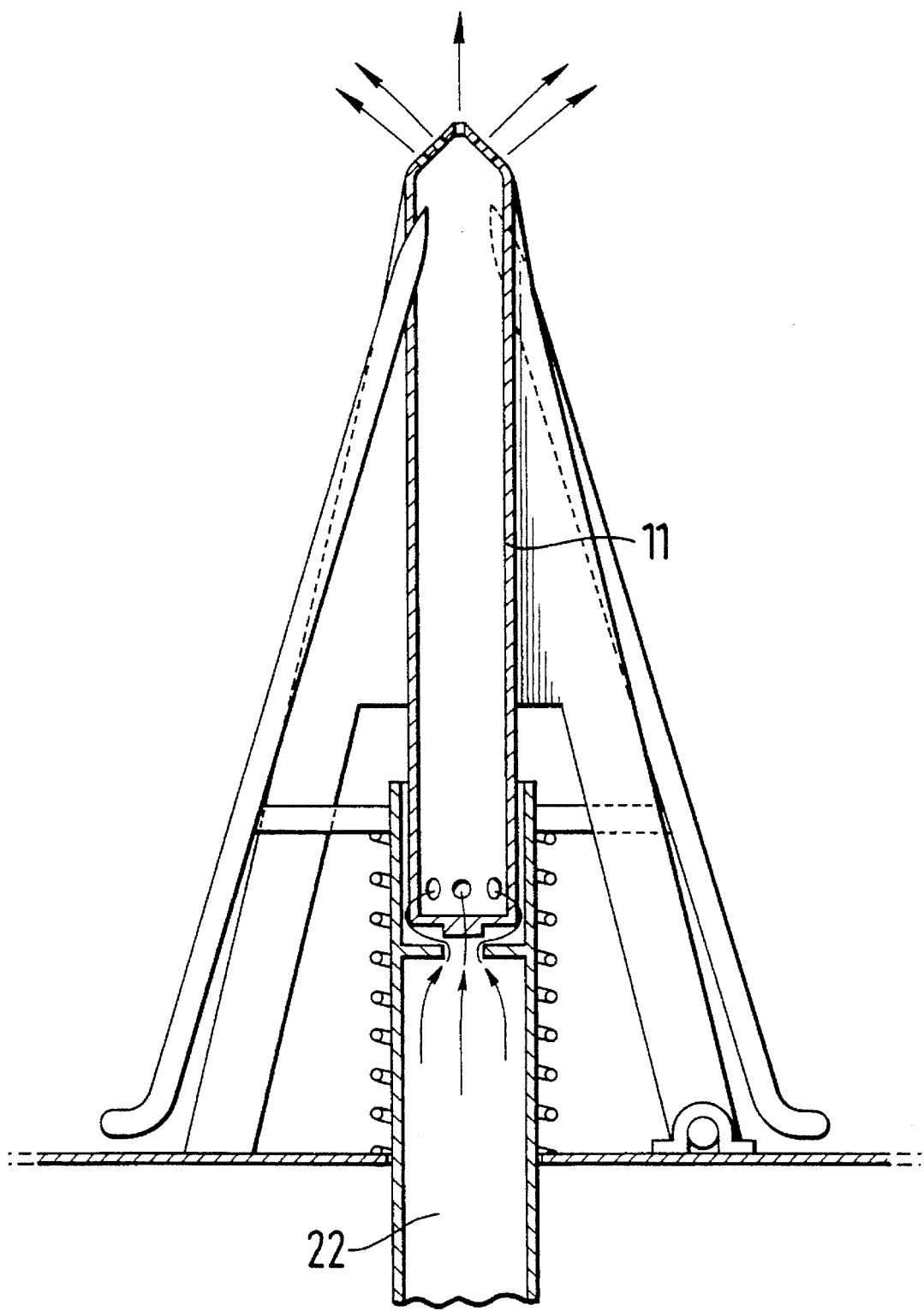
FIG. 5 is a side elevational view of the apparatus similar to that in FIG. 1 but with parts removed and with the apparatus being depicted in the flushing mode.

In use upon positioning or offering an inverted sealed container to the apparatus, the seal of the container is initially ruptured by the point of the cone 14. The outer rim of the mouth of the container then depresses the arms 24; the outer tube 22 is thereby moved downwardly against the bias to disengage the internal flange 27 from its sealing position with the lower end of the tube 11, thereby allowing water to flow through the holes 18 into the tube 11 and thence out of the holes 11 as jets of water to impinge on the inner wall of the container and to flush it out. Meanwhile, the edges 13 of the legs 12 have cut the seal to form four 90° sectors which, on twisting the container, are caused to be folded back towards the inner side of the container mouth. FIG. 5 shows the relative positions of tubes 11 and 22 in the flushing position.

It is to be understood that the simplest embodiment of the invention merely requires the presence of two or more arms or vanes with angled outer edges which in use act as cutting blades and converge to a point or other seal rupturing element, the flushing mechanism not being included.

Figure 6:
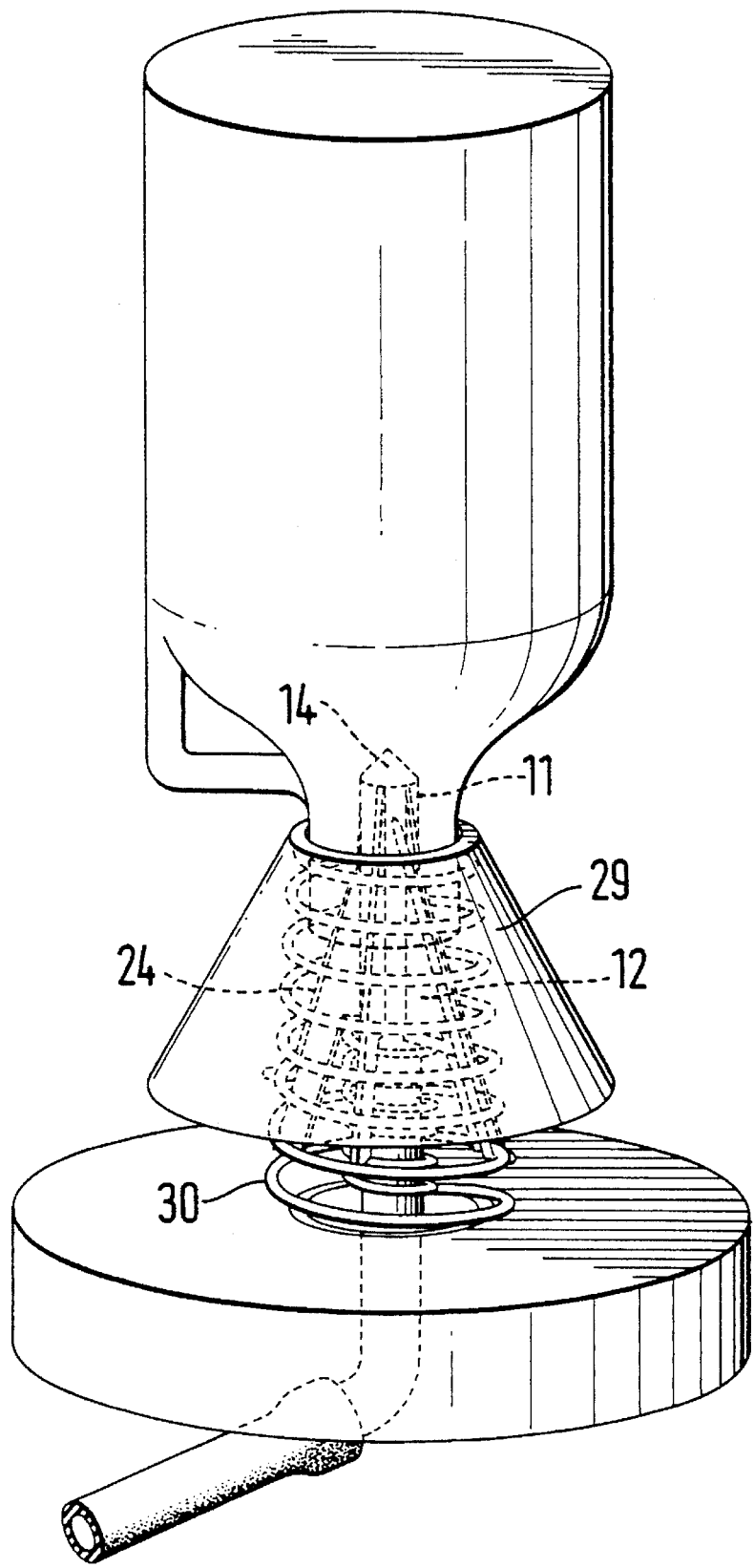
FIG. 6 is a perspective view showing a modified form of the apparatus of FIG. 1 in use with a container in position thereon.

Referring to FIG. 6, the apparatus is shown in perspective with a container containing a chemical concentrate inverted thereon, the upper ends of the tube 11 and of the legs 12 and arms 24 being shrouded by a frusto-conical collar 29, as additional splash or wind-spray protection to the operative. The collar is preferably biassed in an upward direction, for example by means of a compression spring 30, to assist in sealing contact between the collar and the container. Drain holes may be provided in the base plate, or the liquid may be allowed to flow down the outside of the base and into a suitable reservoir or hopper, according to choice having regard to the particular spraying equipment being used.

Figure 7:
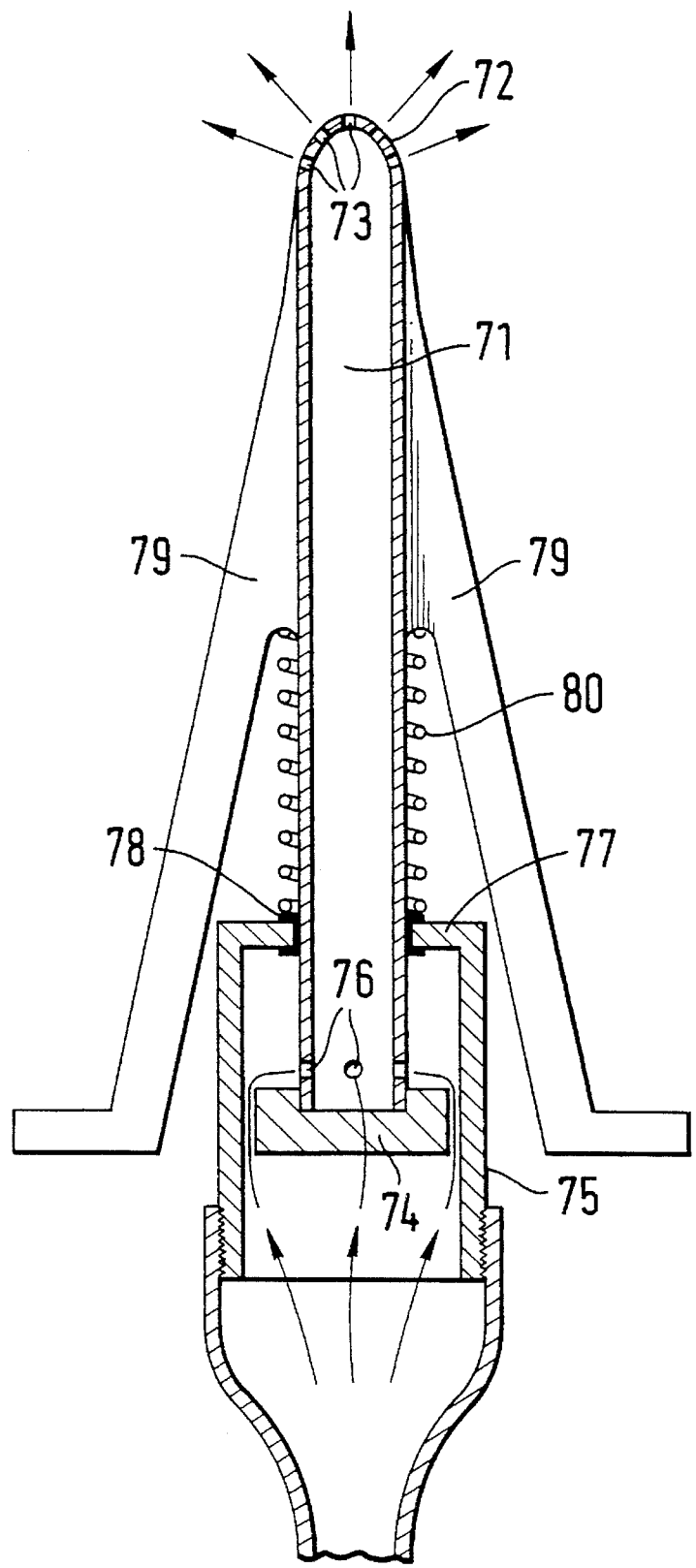
FIG. 7 is a side elevational view showing an alternative form of a seal piercing and container flushing apparatus.

FIG. 7 shows an alternative embodiments of the apparatus in which the arms 24 and legs 12 of the apparatus as previously described are effectively functionally combined. In FIG. 7, a central tube 71 has a domed seal-rupturing head 72 formed with holes 73 for egress of flushing water, as previously described. The lower end of the tube 71 is closed with a screw-threaded blanking element 74 which is a loose fit in second tube 75, connected to a supply of water. An array of holes 76 are formed in the wall of tube 71, above the blanking element 74. The upper end of tube 75 is formed with an inwardly-directed flange 77 which defines an aperture within which tube 71 is slidably carried; an "O" seal or other gasket means 78 is provided to render the sliding connection water-tight.

The tube 71 carries four legs 79, as previously described; a compression spring 80 or other biassing element acts between the flange 77 and the points of attachment of the legs to the tube 71, to urge the tube upwardly and hence the blanking element 74 into sealing engagement with the flange 77. On offering a sealed container to the apparatus, the downward manual fore both ruptures and cuts the seal into segments and also depresses the tube 71 against spring pressure, (as illustrated), thereby permitting flushing water to enter the tube 71 as shown by the arrows, and to issue as jets from holes 73.

Figure 8:
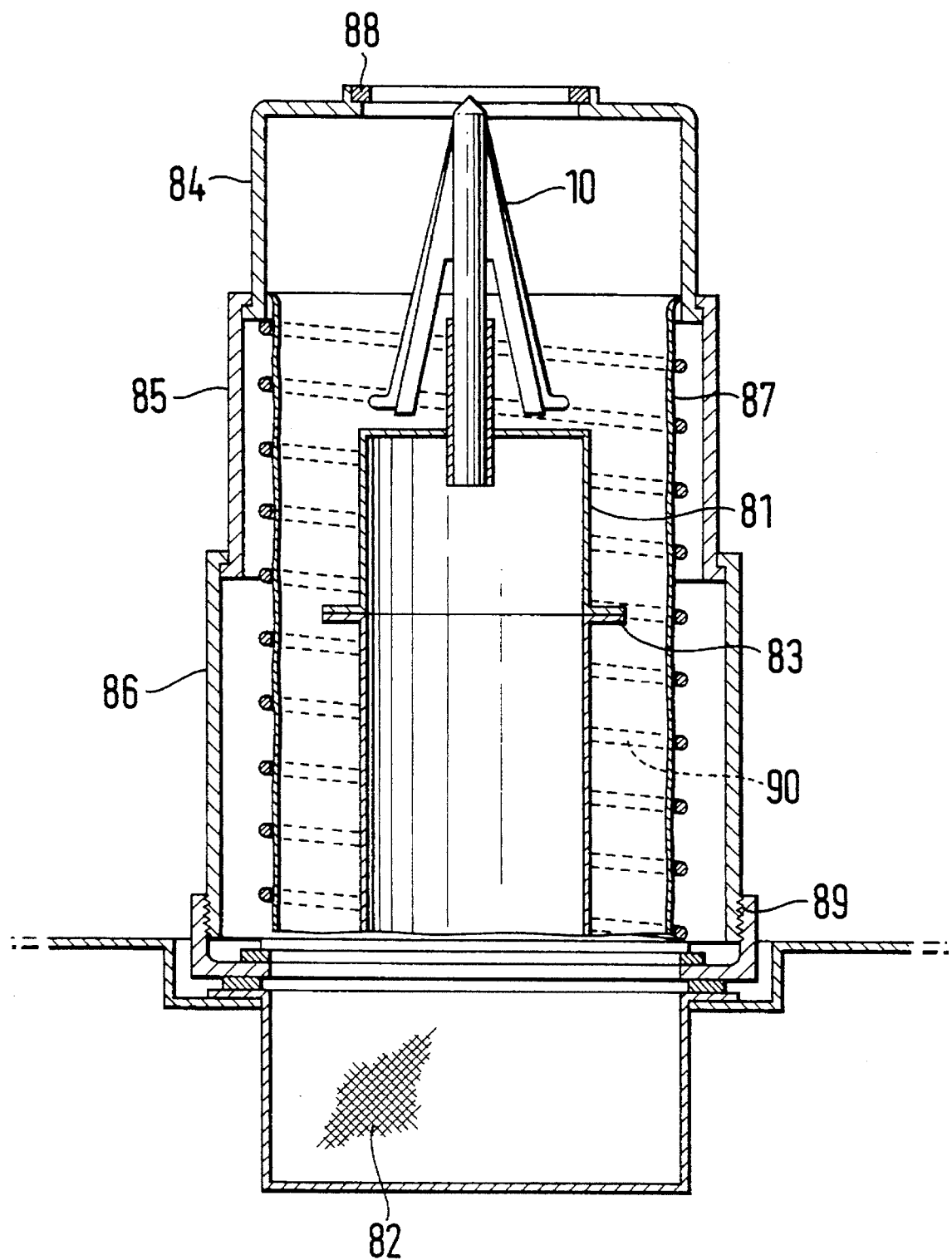
FIG. 8 is a side elevational view, partly in cross-section, showing seal piercing and container flushing apparatus mounted within a telescopic shroud.

With force to FIG. 8, the apparatus 10 as previously described with reference to FIG. 1 to 4 is shown mounted over a cylinder 81 in sealing engagement with a filter screen dish 82 provided in the base of the charging hopper of spraying equipment. In order to effect enclosed transfer of the chemical concentrate to the hopper, the apparatus 10 and cylinder 81 (shown in two parts joined at mating flanges 83) are enclosed by a telescopic shroud formed in three parts 84, 85, and 86 with an inner annular curtain 87 depending from the upper part 84. The function of the curtain is to prevent concentrate from contacting with the inner walls of the telescopic parts although the external flanges of the parts 84 and 85 are arranged to wipe against the inner walls of respective parts 85 and 86 when the parts are telescoped together, to effect a cleaning of any material which may inadvertently have contaminated the walls. The upper part 84 is provided with a circular access hole and a neoprene or other resilient washer 88 for sealing against the neck or shoulder of an inverted container. The lower part 86 is screw-threadedly engaged with a flanged annular element 89 which is received on the periphery or edge flange of the filter screen dish 82. An internal biassing means such as spring 90 urges the telescopic parts to the open or extended condition.

Figure 9:
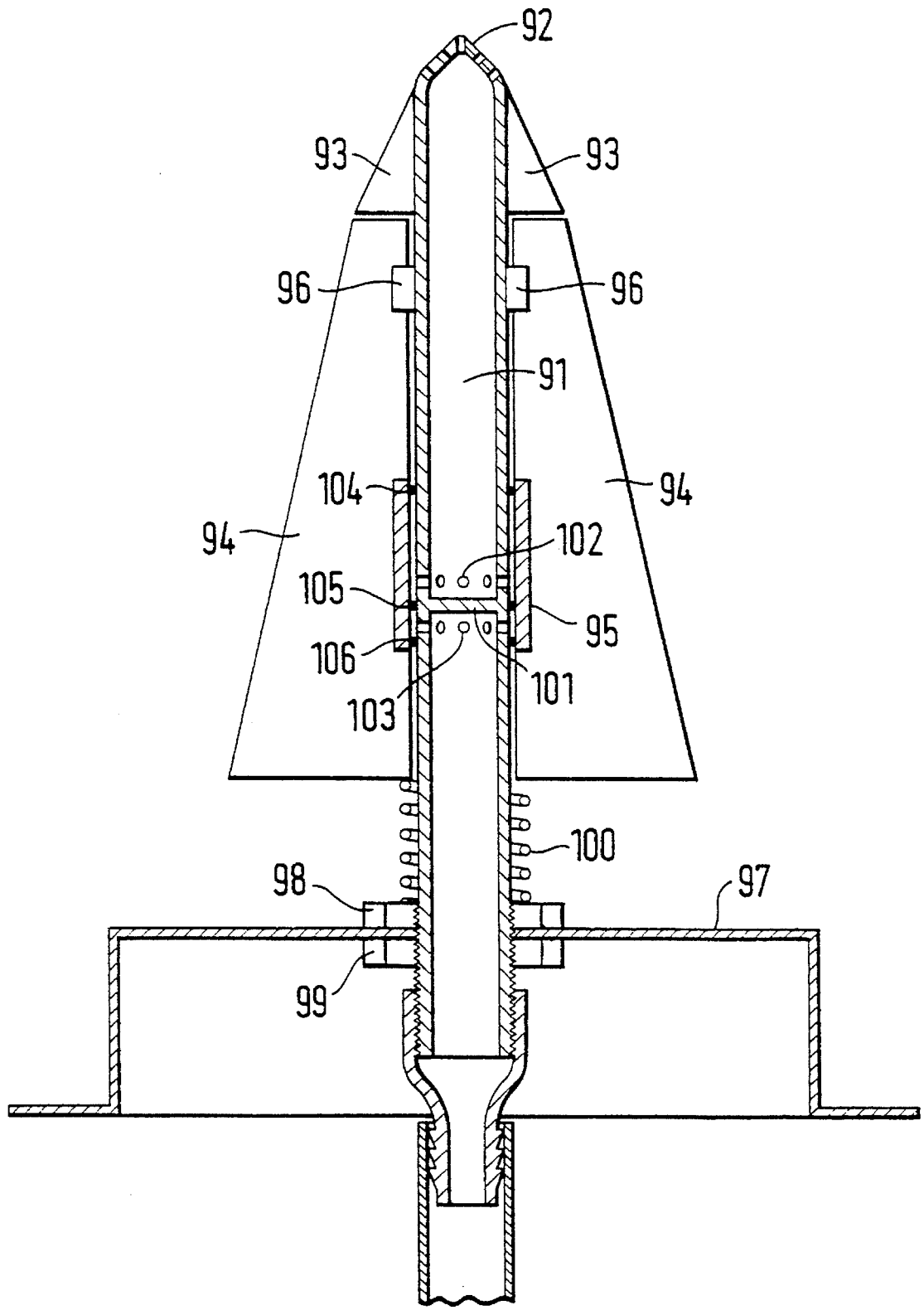
FIG. 9 is a side elevational view, partly in cross-section, showing an alternative form of flushing mechanism.

With reference to FIG. 9, the apparatus includes tube 91 with a conical perforated head 92 and four seal cutting elements 93. Co-planar with each element 93 is a vane 94; the four vanes are connected by welding to a sleeve element 95 so that the vanes/sleeve assembly is slidable on tube 91; guide blocks 96 welded to the tube prevent the assembly from rotating around the tube. The tube is externally screw-threaded at the lower region and is secured to support plate 97 by lock nuts 98, 99.

A coil spring 100 or other biassing means urges the vanes/sleeve assembly in an upward direction.

The tube 91 is provided with an internal partition wall 101 and an array 102, 103 of holes are respectively formed in the wall of the tube on each respective side of the partition. The sleeve element 95 is provided with annular resilient seals 104, 105, 106, arranged to define respective upper and lower annular valve chambers around the periphery of the tube 91. In the position shown in the drawing, holes 103 are in registration with the lower valve chamber defined by seals 105 and 106, whereby no water can flow into the upper part of the tube above the partition wall 101. When the vanes/sleeve assembly is depressed by an inverted container being thrust down upon it, both holes 102 and 103 are in registration with the valve chamber defined by seals 104 and 105, whereby water can flow into the upper part of the tube.

Figure 10:
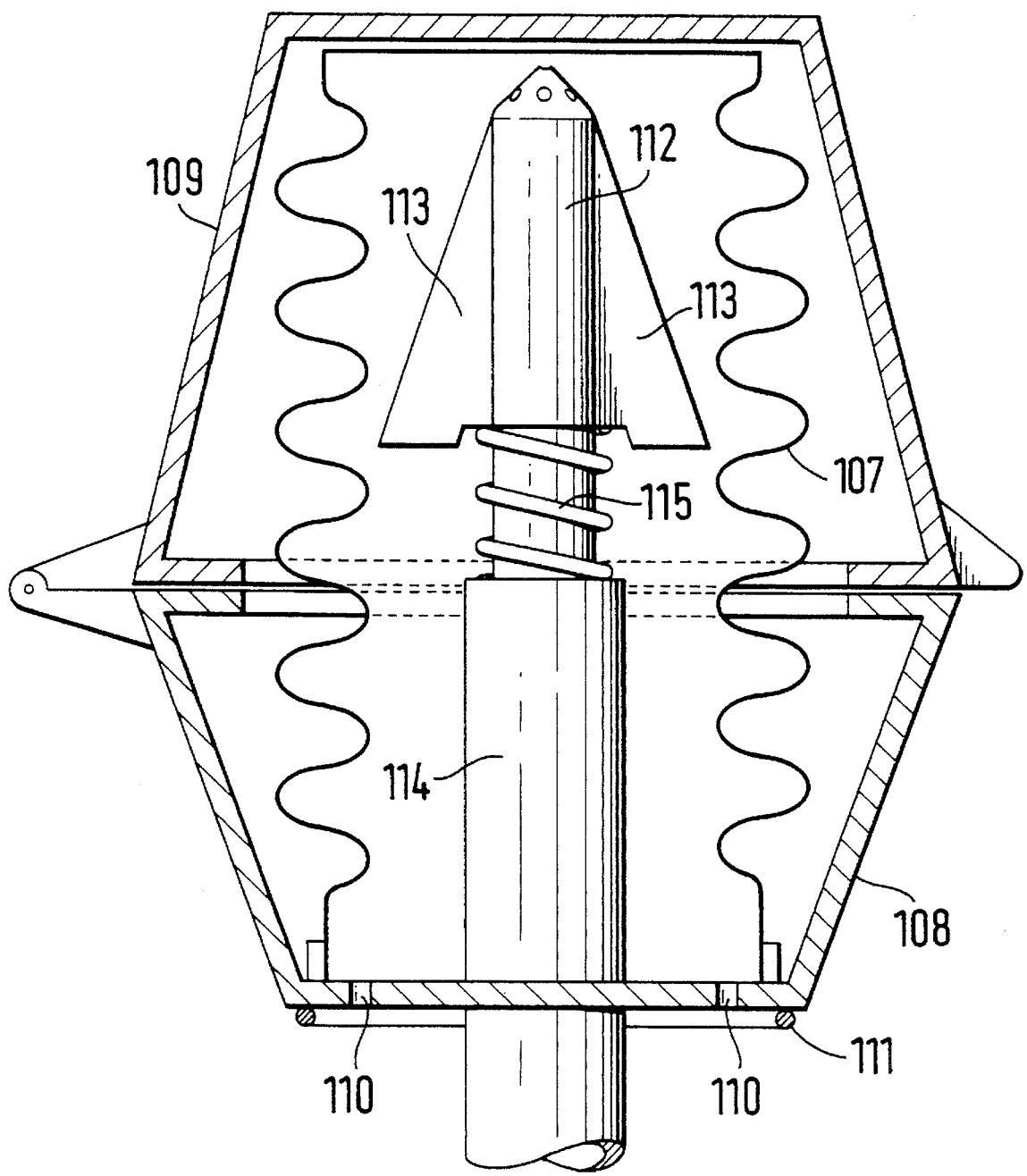
FIG. 10 is a side elevational view, partly in cross-section, showing a seal piercing and container flushing apparatus in a lidded housing.

With reference to FIG. 10, apparatus similar to that described with reference to FIG. 7 is disposed within a rubber or other resilient corrugated shroud 107 the lower end of which is secured to the base 108 of a housing having a hinged lid 109. The base of the housing is provided with drain holes 110 to allow liquid to flow to a charging hopper to which the base is sealingly attached. An annular seal is indicated at 111; the housing may be attached to the charging hopper by bolts (not shown).

In use, the lid of the housing is opened and a container of chemical concentrate is offered, inverted, to the head of the tube 112. The shoulder of the container will form an effective seal against the upper rim of the corrugated shroud 107. Forcing the container down upon the head of the tube with a twisting action will rupture the seal and urge the sector-like flaps thereof, formed by the cutting edges of the vanes 113, back against the internal wall of the neck of the container and will also depress tube 112 relative to tube 114 against the pressure exerted by spring 115, thus enabling water to flow up both tubes 114 and 112 as described with reference to FIG. 7. The shroud will resiliently compress, thereby maintaining the seal around the shoulder of the container.

We claim:

1. Apparatus adapted for the opening of a container which contains hazardous liquid material and is sealed with a membrane, the apparatus comprising a seal rupturing element capable of rupturing the sealing membrane;

a plurality of seal cutting elements capable of cutting the sealing membrane;

support means for supporting said seal rupturing element and said seal cutting elements, said seal cutting elements comprising linear cutting edges inclined away from the seal rupturing element at an angle such that the seal cutting elements generate a cone or frustum on rotation of the apparatus about the longitudinal axis of said support means; and means for flushing out the interior of the container;

whereby in use the membrane seal is ruptured and cut to form sector-like flaps by said seal rupturing elements and said seal cutting elements, the hazardous liquid contents are allowed to drain therefrom and the interior of the container is flushed out whereby the container is rendered safe for disposal.

2. Apparatus according to claim 1, in which the seal rupturing element is formed integrally with the seal cutting elements.

3. Apparatus as claimed in claim 1, adapted to be used with industrial equipment and further including a charging hopper for receiving a liquid composition in the sealed container.

4. Apparatus according to claim 1, wherein said support means comprises a common support member that has a longitudinal axis and which supports said seal rupturing element and a plurality of seal cutting elements;

and wherein there are four seal cutting elements, said four seal cutting elements being symmetrically mounted about the longitudinal axis of the support member.

5. Apparatus according to any claim 1, in which the support member comprises a pipe connected to a supply of flushing liquid.

6. Apparatus according to claim 5, in which the pipe includes valve means for controlling the supply of liquid, the valve means being activated by pressure exerted on the apparatus via a container being emptied.

7. Apparatus according to claim 6, in which the valve means is biassed to a valve-closed position and is connected to valve actuating elements which move the valve means against the biassing pressure to a valve-open position.

8. Apparatus according to claim 7, in which the valve actuating elements are movable longitudinally relative to the seal cutting elements.

9. Apparatus according to claim 7, in which the valve actuating elements are constituted by the seal cutting elements.

10. Apparatus adapted for the opening of a sealed container that includes a neck and which contains hazardous liquid material, said apparatus comprising a seal rupturing element;

a plurality of seal cutting elements;

support means for supporting said seal rupturing element and said seal cutting elements comprising a pipe adapted to be connected to a supply of flushing liquid, in which the upper end of the pipe forms the seal rupturing element and is provided with an array of apertures, whereby flushing liquid can issue from the pipe in the form of a spray; and means for supplying a flushing liquid for flushing out the interior of the container;

whereby in use the seal is ruptured and cut to form sector-like flaps, the hazardous liquid contents are allowed to drain therefrom and the interior of the container is flushed out whereby the container is rendered safe for disposal.

11. Apparatus adapted for the opening of a sealed container that includes a neck and which contains hazardous liquid material, said apparatus comprising a seal rupturing element;

a plurality of seal cutting elements;

support means for supporting said seal rupturing element and said seal cutting elements;

means for flushing out the interior of the container; and further including shroud means to surround the neck of a container during opening and emptying thereof;

whereby in use the seal is ruptured and cut to form sector-like flaps, the hazardous liquid contents are allowed to drain therefrom and the interior of the container is flushed out whereby the container is rendered safe for disposal.

12. Apparatus according to claim 11, in which said apparatus is adapted to be used with a charging hopper having a base; and wherein said shroud means is telescopic and is biassed towards the open or extended position to guard against splashing from substantially the entire vertical distance between the container aperture and the base of the charging hopper.

13. Apparatus adapted for the opening of a sealed container which contains hazardous liquid material, the apparatus comprising a seal rupturing element;

a plurality of seal cutting elements;

support means for supporting said seal rupturing element and said seal cutting element, said support means comprising a pipe connectable to a supply of flushing liquid, said pipe including valve means for controlling the supply of liquid, the valve means being activated by pressure exerted on the apparatus via a container being emptied;

said seal cutting elements comprising linear cutting edges inclined away from the seal rupturing element at an angle such that the seal cutting elements generate a cone or frustum on rotation of the apparatus about the longitudinal axis of said support means; and means for flushing out the interior of the container;

whereby in use the seal is ruptured and cut to form sector-like flaps, the hazardous liquid contents are allowed to drain therefrom and the interior of the container is flushed out whereby the container is rendered safe for disposal.

14. Apparatus as claimed in claim 13 in which said valve means is biassed to a valve-closed position and is connected to valve actuating elements which move said valve means against the biassing pressure to a valve-open position.

15. Apparatus as claimed in claim 14 in which said valve actuating elements are movable longitudinally relative to said seal cutting elements.

16. Apparatus as claimed in claim 14 in which said valve actuating elements are constituted by said seal cutting elements.

* * * * *